US011102453B2

(12) United States Patent
Abalos et al.

(10) Patent No.: US 11,102,453 B2
(45) Date of Patent: Aug. 24, 2021

(54) ANALYTICS BASED LIGHTING FOR NETWORK CAMERAS

(71) Applicant: Cisco Technology, Inc., San Jose, CA (US)

(72) Inventors: Nicholas Dye Abalos, San Francisco, CA (US); Ian Matthew Snyder, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 213 days.

(21) Appl. No.: 15/899,210

(22) Filed: Feb. 19, 2018

(65) Prior Publication Data

US 2019/0261491 A1 Aug. 22, 2019

(51) Int. Cl.
| | |
|---|---|
| H04N 7/18 | (2006.01) |
| H05B 47/115 | (2020.01) |
| H05B 47/125 | (2020.01) |
| H04N 5/225 | (2006.01) |
| G08B 13/196 | (2006.01) |
| G06T 7/246 | (2017.01) |

(52) U.S. Cl.
CPC ............ *H04N 7/18* (2013.01); *H04N 7/188* (2013.01); *H05B 47/115* (2020.01); *H05B 47/125* (2020.01); *G06T 7/248* (2017.01); *G08B 13/19608* (2013.01); *G08B 13/19613* (2013.01); *H04N 5/2256* (2013.01)

(58) Field of Classification Search
None
See application file for complete search history.

(56) References Cited

U.S. PATENT DOCUMENTS

| | | | | |
|---|---|---|---|---|
| 10,165,650 | B1 * | 12/2018 | Fini | H05B 33/0854 |
| 2009/0262189 | A1 * | 10/2009 | Marman | H04N 7/183 |
| | | | | 348/143 |
| 2010/0296285 | A1 * | 11/2010 | Chemel | F21V 29/763 |
| | | | | 362/235 |
| 2017/0324933 | A1 * | 11/2017 | Alrod | H04N 7/142 |
| 2018/0136318 | A1 * | 5/2018 | Uyeno | G01S 7/4972 |

* cited by examiner

*Primary Examiner* — Heather R Jones
(74) *Attorney, Agent, or Firm* — Polsinelli PC (57) ABSTRACT

Systems and methods are disclosed for intelligently activating light devices for optimized lighting conditions in a scene, where optimized illumination is provided by a subset of light devices within an array of light devices in communication with the camera. The systems and methods detect a target within a camera's field of view and determine an optimized illumination of the target according to a video analytics model. Lighting is adjusted in accordance with the determined optimized illumination.

20 Claims, 8 Drawing Sheets

ANALYTICS BASED LIGHTING FOR NETWORK CAMERAS

TECHNICAL FIELD

The present technology pertains to wireless cameras, and more specifically to intelligently activating lighting devices associated with the wireless cameras.

BACKGROUND

Video camera systems can record audio and video in a surrounding area, which users can analyze to monitor and analyze events captured by the recorded audio and video, such as crimes and security events. Captured events in the recorded audio and video can be analyzed in real-time in order to monitor the surrounding area, or at a later time to review the events that transpired in the surrounding area over a period of time. Video camera systems can include capabilities that allow users to receive recorded audio and video and monitor the surrounding area or review captured events. Video camera systems can also include audio and video processing capabilities to perform monitoring and detection operations, such as human detection, facial recognition, motion detection, etc. The various recording and processing capabilities of video camera systems make such systems effective tools for deterring crime, protecting humans and property, and investigating events.

Wireless cameras are proving very popular among modern security consumers due to their low installation costs and flexible mounting options. For example, there is no need to run expensive video extension cables, and wireless cameras can be mounted and/or installed in locations previously unavailable to standard wired cameras. In addition to the ease of use and convenience of access, wireless security cameras allow users to leverage broadband wireless internet to provide seamless video streaming over the internet.

However, wireless cameras struggle with getting good illumination at both short and long distances due to thermal and power limits. For example, in standard infrared (IR) systems, an object in a frame can be underexposed at far distances, but overexposed at short distances. Thus, there is a need for a camera system that intelligently determines and activates optimal lighting conditions for a scene over a dynamic range of distances.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

Systems, methods, and devices are disclosed for intelligently activating light devices for optimized lighting conditions in a scene, where optimized illumination is provided by a subset of light devices within an array of light devices in communication with the camera. The systems and methods detect a target within a camera's field of view and determine an optimized illumination of the target according to a video analytics model. Lighting is adjusted in accordance with the determined optimized illumination.

Example Embodiments

The disclosed technology addresses the need in the art for intelligently determining and/or activating lighting optimized for one or more targets and/or conditions in a scene. The disclosed camera system uses video analytics to determine optimized lighting conditions, and then uses the video analytics determinations to intelligently activate a light device, such as an LED within a matrix of LEDs, to focus on and illuminate targets of interest within the camera's field of view (FOV). The camera system can also track and anticipate where the target will be, so that lighting can be adjusted before over or under saturation occurs, resulting in a more evenly distributed dynamic range of illumination as the target moves throughout the scene. Thus, optimizing illumination can be lighting without over or under saturation issues, but can also include, but is not limited to, lighting that produces the most amount of object/target contrast, informational content, resolution, color differentiation, etc.

The camera system solves the problem of enabling consistent, high quality illumination of targets at both short and long distances, even with thermal and power limits on the individual cameras and/or system. The array of light devices intelligently activates such that a person or target moving in a frame will not be underexposed at far distances or overexposed at short distances close to the camera. Moreover, the camera system can handle lighting for the foreground or the background, and both the foreground and background at the same time.

Since the camera system is composed of commercially available, battery powered security cameras with limited power resources, power in the disclosed system can also be managed based on how the lighting devices are activated. Cameras with wide FOVs, for example, have trouble optimizing illumination at long distances due to thermal and power limits. They have to blast their entire FOV with light (e.g., infrared) and/or increase the sensor gain (which increases noise) and/or exposure time (causing motion blur, etc.) to preserve image fidelity. Facial recognition (performed either manually by a viewer or by facial recognition systems on the camera itself) becomes increasingly difficult. Moreover, even when the camera reduces the IR power and sensor gain, aperture, or shutter speed, the camera can lose illumination of the background and background targets. As described below, the disclosed camera system's array of light devices that intelligently activate individual light devices or a subset of light devices can conserve power resources while illuminating both background and foreground targets at the same time.

In addition, the intelligence of the camera system itself allows it to be proactive—rather than merely reactive—to exposure of a scene. Reactive camera systems that turn on or off various sets of IR LEDs in order to achieve long or short range illumination suffer delays in making corrective changes, resulting in frames with poor lighting conditions. For example, when a reactive camera's overall exposure of the scene is too bright, it will dim the illumination. When a scene is underexposed, it will increase the illumination. However, the camera must adapt to the exposure of the prior captured frame, and thus the speed of the adaptiveness of the camera and overall system is limited. A proactive camera system, by contrast, can predict optimized illumination in real time or almost real time, and can make adjustments without analyzing each previous scene.

The disclosed technology, therefore, provides a solution to the technological problems outlined above based on an analytics based lighting system. The analytics based lighting system is based on video analytics models that determine optimized lighting conditions in a scene. The camera system's analytics based lighting can also predict how lighting conditions should change before any over or under saturation occurs by tracking and/or anticipating where the target will be at a subsequent period of time. Accordingly, when IR lighting is intelligently controlled through analytics based lighting, the system becomes proactive rather than reactive.

Figure 1:
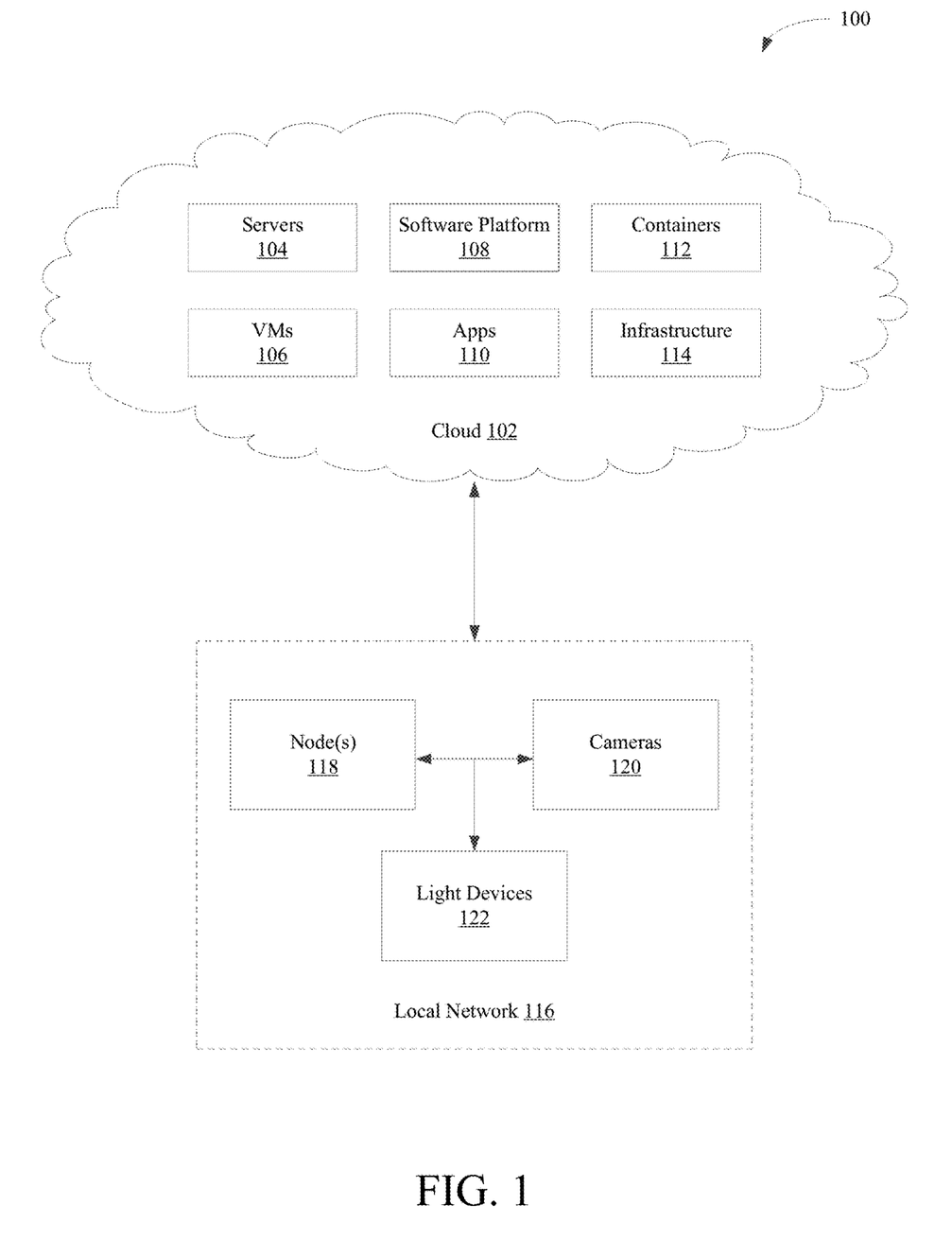
FIG. 1 illustrates an example camera and video management environment.

FIG. 1, for example, illustrates an example camera and video management environment (e.g., camera system 100). A local network 116 can include one or more cameras 120, light devices 122, and node(s) 118 (e.g., computing devices) configured to communicate with each other over the local network 116. Node(s) 118 can include any network-capable devices, such as laptops, phones, access points, switches, servers, televisions, network storage systems (SANs), tablet computers, kiosks, Internet of things (IoT) devices, etc. Cameras 120 can include one or more types of cameras with networking and data storage capabilities.

Cameras 120 can be set up in various locations to capture and record/store data from their respective locations. Each camera 120 can record video and audio and store the recorded video and audio locally and/or transmit the recorded video and audio to other devices for storage, monitoring, analysis, etc. Each camera 120 can communicate with other cameras over the local network 116, as well as other devices. For example, each camera 120 can probe the others for data, conditions, management, etc. As another example, camera 120 can communicate with one or more nodes 118 to transmit recorded data and/or receive management instructions.

Light devices 122 can be any light device or array of light devices, that illuminates all or a portion of camera's 120 FOV. For example, light devices 122 can be a static matrix of different FOV LEDs or individually position-able LEDs of various FOVs (field of view). Light devices 122 can be built into the camera or can be an external accessory that communicates with the cameras in an area (e.g., an external illuminator such as a flood light). When the array of light devices is built into the camera, each light device within the array of light devices can have a different illumination area which may or may not overlap with the illumination area of other light devices in the array. For external light devices 122, each light device within the array can be individually positionable devices that are located at a fixed position with an illumination area that similarly may or may not partially overlap with the illumination area of other light devices in the array.

In some embodiments, local network 116 can be communicatively coupled to one or more remote networks, which in this example is represented by cloud 102. It should be noted that the one or more remote networks are not limited to cloud networks or environments. Cloud 102 is illustrated herein for clarity and explanation purposes, as other types of networks and network environments are also possible and contemplated herein.

Cameras 120 and nodes 118 can communicate with cloud 102 via local network 116. In this example, cloud 102 can include one or more private, public, and/or hybrid clouds. Moreover, cloud 102 can include cloud elements, such as, for example, servers 104, virtual machines (VMs) 106, one or more software platforms 108, applications or services 110, software containers 112, and infrastructure nodes 114. Infrastructure nodes 114 can include various types of nodes, such as compute nodes, storage nodes, network nodes, management systems, etc. In some cases, Infrastructure nodes 114 can include a controller for managing cameras 120, light devices 122, and/or local network 116.

Cloud 102 can provide various cloud computing services, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), cloud-based management services, and other types of services such as desktop as a service (DaaS), information technology management as a service (ITaaS), managed software as a service (MSaaS), mobile backend as a service (MBaaS), etc.

Cameras 120 and nodes 118 can communicate with cloud 102 via one or more public networks (e.g., Internet), private networks, and/or hybrid networks. For example, in some cases, cameras 120 can communicate with cloud 102 via a virtual private network (VPN) or tunnel between the cameras 120 on the local network 116 and the cloud 102.

Figure 2:
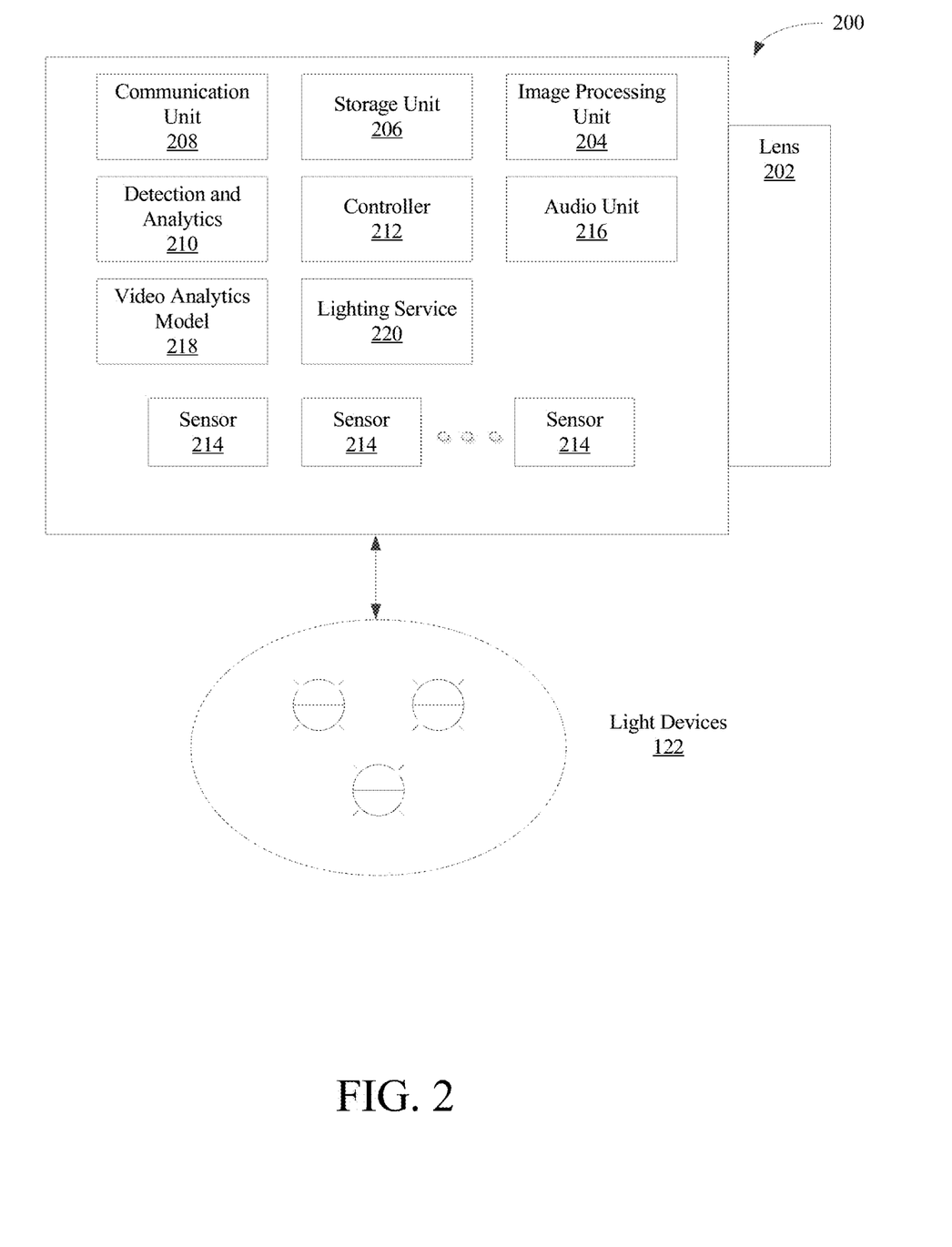
FIG. 2 illustrates an example architecture of an example camera system.

FIG. 2 illustrates an example architecture 200 of an example camera system 100. The architecture 200 can include lens 202 for capturing video and images. Lens 202 can include an image sensor. In some cases, lens 202 can include various adjustment parameters, such as tilt, rotation, pan, focus, FOV, etc. Lens 202 can also include other imaging parameters, such as aperture, image quality parameters, zoom parameters, shutter speed, etc.

Image and video data captured by lens 202 can be provided as input to other components in camera system 100, such as image processing unit 204 and detection and analytics unit 210. Image processing unit 204 can provide one or more image and video processing capabilities based on the input from lens 202. For example, the image processing unit 204 can process input signals to generate frames of pixels and process the frames to enhance the image content. Image processing unit 204 can also perform other image and video processing capabilities such as, for example, video encoding/decoding, filtering, pixel correction, enhancement, focusing, brightness adjustment, etc.

The architecture 200 can include one or more sensors 214 for detecting various signals and conditions, such as image sensors, motion sensors, noise sensors, light sensors, complementary metal-oxide semiconductor (CMOS) sensors, flame detection sensors, proximity sensors, biosensors, machine vision sensors, video sensors, smart scene sensors, tracking sensors, speech recognition sensors, multimodal sensors, hall effect sensors, speed sensors, smoke sensors, metal detector sensors, explosive detection sensors, impact sensors, shock sensors, pressure sensors, moisture sensors, heat sensors, position sensors, tilt sensors, air flow sensors, chemical sensors, gyroscopes, accelerometers, etc. Sensors 214 can include hardware and/or software sensors, as well as other components such as processors, memory, etc.

The architecture 200 can also include one or more audio units 216. Audio units 216 can include audio speakers, microphones, audio signal processing elements, etc. Audio units 216 can capture and detect sound, and determine sound characteristics, such as source, localization, particular intensity, timing cues, spectral cues, patterns, etc. For example, audio units 216 can include one or more microphones to detect audio and can include logic to recognize the audio (e.g., human, environmental, etc.), recognize the level or intensity of the audio, identify the location or origin of the audio, identify the direction and distance of the audio, recognize speech, recognize specific types of sounds, etc.

Data calculated or collected from sensors 214 and/or audio unit 216 can be provided to detection and analytics unit 210, which can implement such data along with image and/or video data to detect specific characteristics or conditions in the content of any of the captured data, detect objects and events, and perform other detection operations.

For example, detection and analytics unit 210 can analyze various aspects of the captured data, such as pixels, frames, sound, images, frame sequences, sensor data, etc., to perform detection operations. Non-limiting examples of detection operations can include tamper detection, blocking (i.e., blocking of the lens 202), re-positioning (i.e., camera and our lens re-positioning), focus changes, impact detection, human detection, object-in-hand detection, sound classification, facial recognition, video segmentation, object recognition, motion detection, event detection, lighting detection, smart scene detection, etc.

Storage unit 206 can include one or more storage or memory devices for storing captured data, such as video and image data recorded by camera system 100, metadata associated with the recorded data, sensor data, recognition data, etc. Storage unit 206 can include one or more solid state storage devices, disk storage devices, and/or any type of storage or memory devices.

Communications unit 208 can include one or more network interfaces for communicating with other devices over a network, such as local network 116. Communications unit 208 can include wireless and/or wired network interfaces. For example, in some cases, communications unit 208 can include a wireless network interface card for communicating with other devices via a wireless network (e.g., WI-FI). Camera system 100 can send and receive data to and from network devices via communications unit 208.

Video analytics model unit 218 can include one or more video analytics models that analyze captured data to determine an optimized illumination of a scene. The video analytics models may be based on one or more power functions, prioritization of the target, signal to noise ratios, etc., which can be applied to captured data in order to make a decision or prediction about how to best adjust illumination. In some embodiments, the video analytics models may be machine learned, such as by training the models on historical frames captured by the same or similar system.

For example, how the lighting should be adjusted in order to consistently illuminate foreground, background, or both foreground and background objects can be determined after the video analytics models are applied to the captured data. In some cases, video analytics models can predict future locations of the target and, based on the prediction, determine optimized illumination for a subsequent period of time. For example, the video analytics models can predict that a person walking to the left toward a camera will continue to follow that trajectory, and can determine that lighting needs to be adjusted such that lighting is not overexposed as the person arrives at the predicted spot.

Lighting service unit 220 can receive input from video analytics model unit 218 and, based on the input, determine which light devices 122 within the array should be activated, and by how much. Lighting service unit 220 can determine that an individual light device 122 should be activated, and/or that a subset of light devices 122 within the array should be activated in order to achieve the optimized illumination determined by video analytics model unit 218.

Controller 212 can include rules, policies, logic, instructions, etc., to manage lighting operations of light devices 122. The lighting operations can include prioritizing light devices to be activated, trigger lighting in accordance with lighting service unit 220, timing of lighting, selection of individual light devices 122, etc. Controller 212 can process input from lighting service unit 220 and/or video analytics model unit 218, detect conditions, stored rules and settings, and other factors to determine when to initiate lighting, which light devices to activate, where to activate lighting, how to prioritize which light devices are activated, determine when to trigger changes in lighting, etc. Controller 212 can also include rules or instructions for communicating with other devices as part of a determination for when to initiate lighting, which light devices to activate, where to activate lighting, etc., as further described below. Controller 212 can also coordinate with the network and other devices on lighting operations.

The components in architecture 200 described herein are non-limiting examples provided for clarity and explanation purposes. It should be noted that other configurations can include more or less components, can include components that are a combination of one or more components illustrated, and can include components that are not illustrated in architecture 200 but would be recognized by one of skill in the art.

Figure 3:
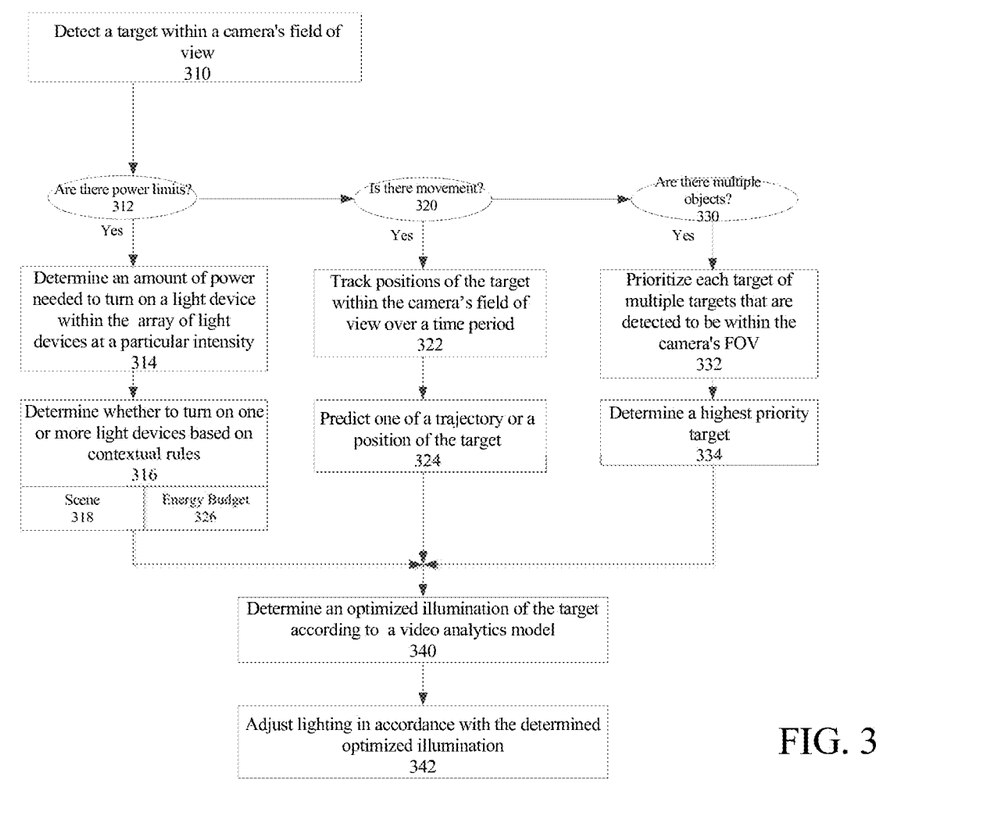
FIG. 3 is a flow chart illustrating an example embodiment for lighting optimization based on a video analytics model.

FIG. 3 is a flow chart illustrating an example embodiment for lighting optimization based on a video analytics model. One or more methods begin by detecting a target within a camera's FOV (step 310). For example, a camera within camera system 100 can recognize one or more people within the scene, but may be unable to facially recognize (or get an acceptable quality face image for forensics later) of someone in the scene. As a result, if a good face shot/identification is desired, the system or camera can determine that the current lighting condition is not adequate. Based on this determination, the camera/system can determine that a lighting change is needed, and can determine that the system needs to adjust one or more LEDs within the array of LEDs.

Figure 4:
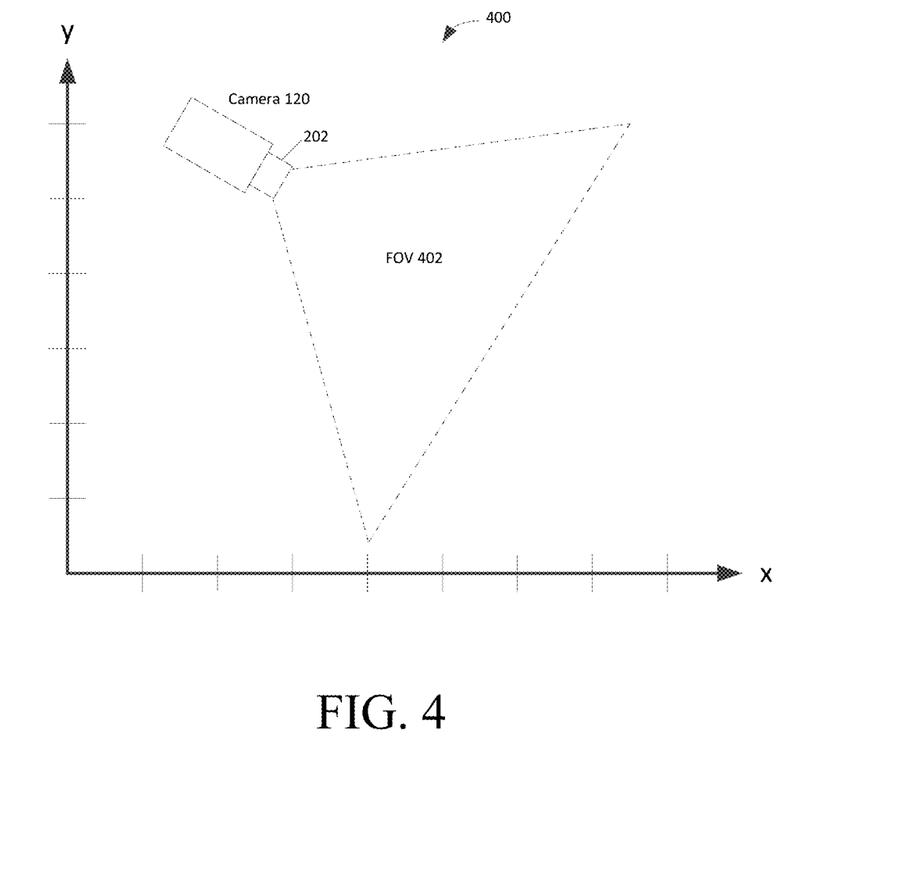
FIG. 4 illustrates an example diagram of a field of view of a camera.

FIG. 4, which illustrates an example diagram 400 of a field of view 402 of a camera 120, shows how much of a scene can be seen or captured by the camera 120. The field of view (FOV) 402 can include a view depth, width, angle, height, etc. The field of view 402 can depend on various factors, such as the angle of the camera, the lens of the camera, the aperture of the camera, the focus of the camera, the zoom settings of the camera, etc.

For example, a narrow FOV may result when the camera is zoomed in, and may only show a small part of a scene (e.g., the door entrance to a room). On the other hand, a wide FOV may result when the camera is zoomed out, and may show a larger part of the scene (e.g., the entire room in addition to the door entrance).

Figure 5:
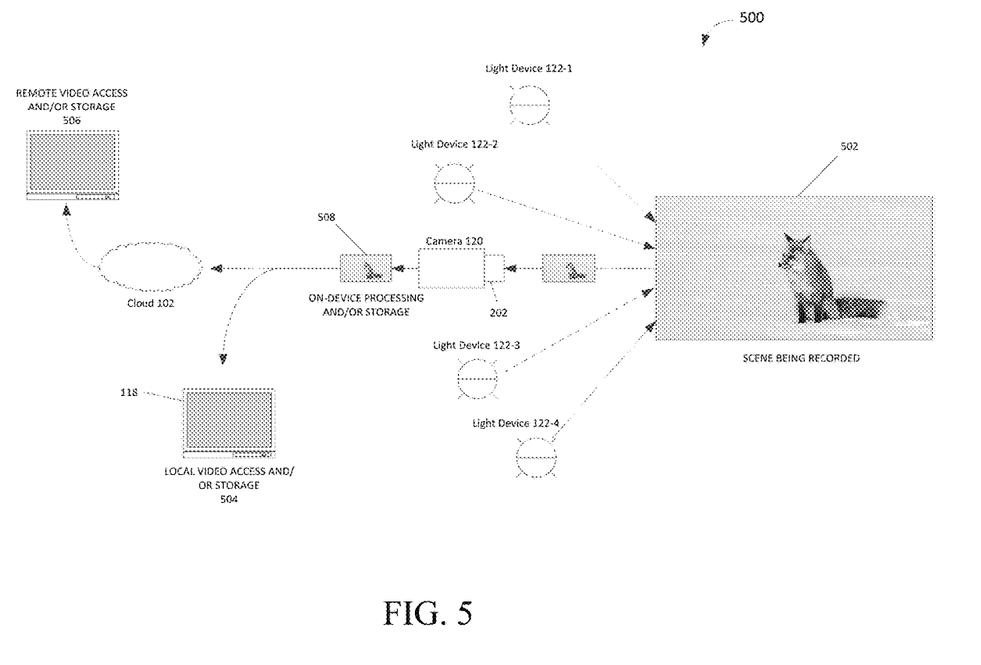
FIG. 5 illustrates an example diagram 500 for capturing and monitoring video within individual camera's FOV in an example video camera environment.

FIG. 5 illustrates an example diagram 500 for capturing and monitoring video within an individual camera's FOV in an example video camera environment, such as camera system 100. In this example, camera 120 and light devices 122-1, 122-2, 122-3, and 122-4 are capturing and recording a scene 502 via their respective lenses 202 (although in other embodiments more than one camera may be used with complete or partial overlap of their respective FOV's). Depending on the respective areas of coverage and positions, the scene 502 captured by camera 120 and light devices 122-1, 122-2, 122-3, and 122-4 can be the same scene or different/overlapping scenes. In some cases, the scene 502 can be the same scene captured from different lighting areas by light devices 122-1, 122-2, 122-3, and 122-4 based on one or more factors associated with light devices 122-1, 122-2, 122-3, and 122-4, such as respective positions or locations, respective angles, respective proximities, respective illumination settings, etc. For explanation purposes, the examples below will describe the scene 502 as the scene captured from camera 120 illuminated by light devices 122-1, 122-2, 122-3, and 122-4 that have partial overlap in illumination areas.

In some embodiments, camera 120 can capture scene 502 illuminated by all or a portion of light devices 122-1, 122-2, 122-3, and 122-4, and can analyze and/or store respective recorded data locally 508 at camera 120 (e.g., video analytics model unit 218 and storage unit 206, respectively). The recorded data can include raw and/or processed image or video data, such as pixels and frames; metadata, such as timestamps, tags, classification information, labels, file or content descriptions, file information, frame information, titles, etc.; sensor data captured by the camera 120 as part of the recording; etc.

Camera 120 can analyze the recorded data according to one or more video analytics models locally 508 on its respective architecture (e.g., video analytics model unit 218) as previously mentioned, and/or transmit the recorded data to one or more nodes 118 and/or cloud 102 for analysis. For example, camera 120 can transmit the recorded data to a node 118 on the local network 116 for local analysis, storage, or display 504 at the node 118, and/or to cloud 102 for remote analysis, storage, or display 506 at cloud 102. In some embodiments, the recorded data is stored (remotely or locally) as well as analyzed.

In some cases, camera 120 can transmit the recorded data to node 118 and/or cloud 102 as a video feed for local display at the node 118 and/or remote display at cloud 102, either before or after analysis. The cloud 102 can also receive such a video feed and provide the video feed for access (e.g., display) by other devices over a network, such as the Internet. For example, the cloud 102 can receive the video feed and allow other devices to stream the video feed from the cloud 102 for analysis or presentation at the devices. Thus, users can access the video feed on the cloud 102 from any device and monitor the scene 502 being recorded by camera 120.

Referring back to FIG. 3 lighting adjustments can take power resources and limits into consideration in some embodiments (step 312). Thus, if there are power limits or constraints, camera system 100 can determine an amount of power needed to turn on a light device within the array of light devices at a particular intensity (step 314). Based on the content of the scene within the camera's FOV (the content being analyzed according to the analytic model(s)) (step 318) and/or one or more energy budgets set for the camera/camera system (step 326), for example, camera system 100 can determine whether to turn on one or more light devices based on a set of contextual rules according to the amount of power needed and allowed for the light device. The contextual rules can be based on the context of the scene within the field of view and the received energy budget for the camera. For example, the analytics based lighting can direct IR to focus on the highest priority target (determined by the camera), potentially even giving up illumination of the rest of the scene for a brief moment if it needs to. Such an example would be assigning an approaching unidentified human the highest priority and an ambling cow the lowest priority, so that the system can devote more lighting resources to the person rather than the cow. This would give camera system 100 more power/thermal budget to intelligently dedicate to a smaller section of the image or video.

Figure 6:
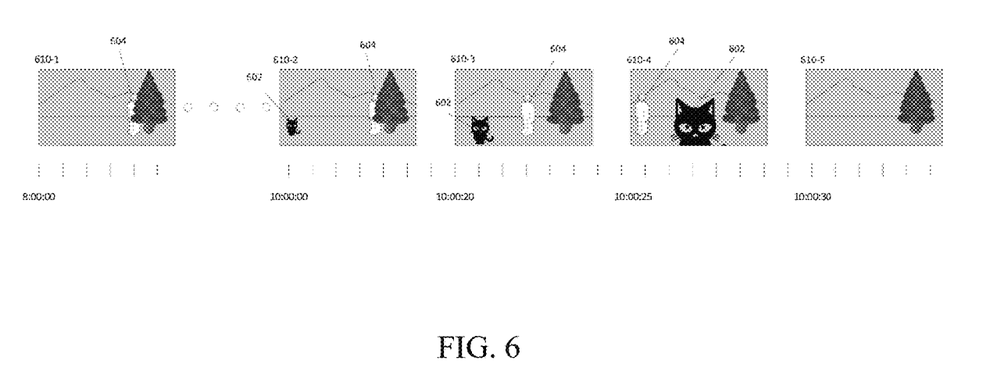
FIG. 6 illustrates an example of power management in an example video camera environment.

FIG. 6, for example, illustrates a further example of power management. Frames 610-1, 610-2, 610-3, 610-4, and 6-10-5 show camera 120's FOV, which are illuminated by light devices 122-1, 122-2, 122-3, and 122-4. Frame 610-2 shows that targets 602 and 604 are present within the FOV at time 10:00:00 hours. Some embodiments can classify targets 602 and 604 within the image or frame, using one or more image classification algorithms that match the detected targets to machine vision models or techniques of known objects, animals, or people. The image classification algorithms can be one or more models of objects, animals, and people in different positions or orientations. While the image classification algorithms can be generated, stored, and/or processed locally on the camera, in some embodiments, the classification of the target can be based on a model stored remotely from the device (e.g., such as in the cloud). In this case, target 602 can be classified as an animal and target 604 can be classified as a person. In some embodiments, target 604 may be classified further to a particular individual (e.g., a specific employee) based on facial recognition.

At frame 610-2, both target 602 and target 604 are in the background. In order to illuminate both targets, subsets within the array of light devices that correspond to the different targets can be optimized to appropriate, different intensities. Thus, if light devices 122-1, 122-2 have a FOV that overlaps with target 602, and if light devices 122-3, 122-4 have a FOV that overlaps with target 604, lighting can be optimized such that light devices 122-1, 122-2 light up target 602 at a first intensity, and light devices 122-3, 122-4 light up target 604 at a second intensity (in this case, the first and second intensities can be different or the same depending on the lighting needs to illuminate the target). Accordingly, intelligent activation of lighting can optimize a first subset of light devices to a first intensity, and a second subset of light devices to a second intensity, and so on.

At frame 610-3 at time 10:00:20 hours, however, target 602 begins to move from the background to the foreground (e.g., is running in a direction towards camera 120). As target 602 approaches, light devices 122-1, 122-2 can adjust the sensor gain, iris, power, particular intensity, etc. to illuminate target 602 such that target 602 does not get over or underexposed in the frame. In some embodiments, system can maintain the same relative illumination of target 602 over all frames.

Moreover, in some embodiments, as target 602 continues to approach in frame 610-4 at time 10:00:25 hours, the camera's sensor could prepare for lighting adjustments (e.g., increase or decrease the IR lighting) by adjusting the sensor gain, iris, etc. before or as the target's approach is happening, improving response time. Thus, when camera 120 has an object in its foreground but the system wants to illuminate targets in the background, with enough LEDs, the power on the LEDs aimed at close targets can be lowered while LEDs illuminating the longer distances and background can be maintained at high power. This avoids issues associated with having good image quality of objects in the foreground, but sacrificing quality in the background, because both the background and foreground will have optimized illumination.

In addition, some targets, while detected, may not be of interest to the same (e.g., an ambling cow may not be considered a threat from a security system standpoint, but an unidentified approaching person may be). For embodiments like this, assuming target 602 is considered a threat but target 604 is not, power can also be managed as target 602 approaches by illuminating target 602 with light devices 122-1, 122-2, but turning off or de-optimizing light devices 122-3, 122-4 in accordance with some received energy budget. In some embodiments, power can moreover be redirected from light devices 122-3, 122-4 to light devices 122-1, 122-2 based on an energy budget. For example, while target 602 is illuminated throughout frames 610-2 through 610-4, the system can turn off lighting for target 604 to save and/or redirect power to light devices 122-1, 122-2.

Referring back to FIG. 3, in some embodiments, targets can be tracked within camera 120's FOV if there is detected movement (step 320). For example, the position of one or more targets within a frame can be detected, determined, logged, and/or stored over a time period (step 322), such that the system predicts a trajectory or future position of the target (step 324). Based on the prediction, the system or camera 120 can send a request to some set of light devices to adjust lighting in accordance with optimizing illumination at the time of the prediction.

In some embodiments, camera 120 can be in communication with a second camera, such as a neighboring camera within target 602's trajectory. Based on the predicted trajectory of target 602, the second camera can be informed that lighting should be adjusted in accordance with an illumination determined by camera 120 or camera system 100. Thus, neighboring cameras can request and/or inform other cameras within the system to reduce their respective IR power/sensor gain/etc. before the target appears in the scene. This is especially useful for targets that are predicted to appear at distances close to the neighboring camera, where lighting adjustments should be quickly made to preserve image fidelity.

In embodiments where one or more light devices are external to the camera, the system can aim a powerful source of light (e.g., a floodlight) at the target, even while moving, rather than adjust the entire FOV lighting.

Additionally and/or alternatively, audio sources can be captured by sensors 214 (or other external sensors). The audio source may belong to a source outside the FOV of camera 120, or indeed outside the FOV of the any camera within the system. Based on the audio source detection, however, video analytics models may be applied that determine or infer the location of a target that's about to enter the scene. Lighting can then be adjusted based on the predicted location/trajectory, such as by directing a floodlight to its predicted location or adjusting gain based on its predicted location and an identification of the target (e.g., the sound may be identified as vocalizations of a cow at some distance from the camera).

In some embodiments, the system and/or camera 120 can determine that there are multiple targets within the frame/FOV (step 330). After detecting and/or identifying the targets of interest, each target within the FOV can be prioritized (332). A highest priority target can be determined (step 334), and lighting can be adjusted in the subset of light devices that illuminate the highest priority target. For example, target 602 can be prioritized over target 604 (for any number of reasons, such as identifying that target 604 is a recognized employee, determining that target 604 is passing by [not approaching camera 120], target 602 is identified as a threat, etc.). Thus, illumination can be optimized for target 602, but de-optimized or even turned off for target 604.

Thus, based on one or more of power limits, target movement, or number of targets within the FOV, the illumination can be optimized according to the video analytics models (step 340). The video analytics models, which may be based on one or more power functions, prioritization of the target, signal to noise ratios, etc., can be applied to video data in order to make decisions and/or predictions about how to best adjust illumination. For example, lighting can improved by determining that the signal to noise ratio is low, and that adjusting lighting by turning on a pair of lighting devices will increase the signal to noise ratio within a certain power constraint. In some cases, video analytics models can predict future locations of the target and, based on the prediction, determine that lighting needs to be decreased or increased for certain lighting devices. For example, the video analytics models can predict that a person walking towards the camera will continue to follow that trajectory, and can determine that lighting needs to be decreased as the person arrives at the predicted spot so as not to overexpose the target. In some embodiments, the video analytics models are machine learned, and were trained on historical frames captured by the same or similar system.

The optimized illumination is achieved through intelligently activating and/or adjusting a subset of light devices within an array of light devices in communication with camera 120, such that a first subset is at a first intensity, a second subset is at a second intensity, and so on (step 342).

Figure 7:
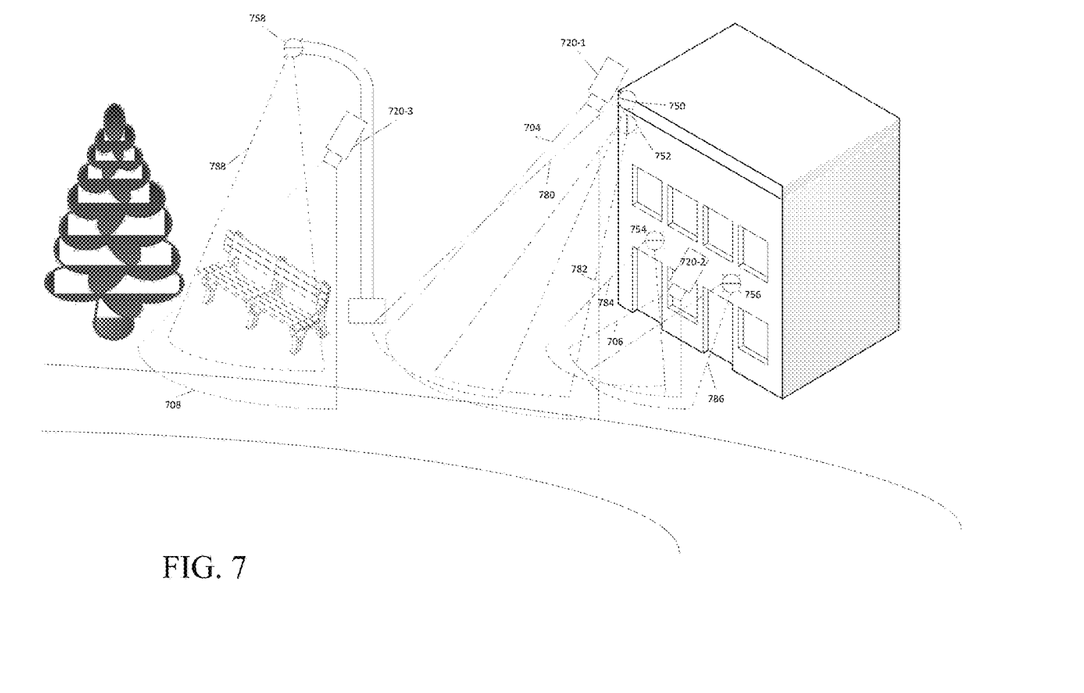
FIG. 7 illustrates an example placement of multiple cameras in a particular site.

FIG. 7 illustrates an example placement of multiple cameras in a particular site. In this example, cameras 720-1, 720-2, 720-3, 720-4 are positioned at different locations in a site to capture different scenes at the site. For example, camera 720-1 is located at a second floor location of a building, which allows the camera 720-1 to capture and record video within the FOV 704 of camera 720-1 from the second floor location. FOV 704 is illuminated by light device 750 with area of illumination 780 and light device 752 with area of illumination 782.

Camera 720-2 is located at first floor location on a side of the building, which allows the camera 720-2 to capture and record video within FOV 706 of the camera 720-2 from the first floor location. FOV 706 is illuminated by light device 754 with area of illumination 784 and light device 756 with area of illumination 786.

Camera 720-3 is located on a light post location, which allows the camera system 720-3 to capture and record video within the FOV 708 of the camera 720-3 from the light post location. FOV 708 is illuminated by light device 758 with area of illumination 788.

As illustrated, cameras 720-1, 720-2, and 720-3 can capture different angles, areas, objects, etc., of a site based on their respective locations and FOVs 704, 706, and 708. In some configurations, the FOV of two or more cameras may overlap. For example, FOV 704 of camera 720-1 can overlap with FOV 706 of camera system 720-2 to yield an overlapping area of coverage. The overlapping area of coverage can be useful to capture different angles and perspectives of the same area.

Because the FOVs 704 and 706 of cameras 720-1 and 720-2 provide an overlapping area of coverage, both cameras 720-1 and 720-2 can detect conditions, events, objects, threats, etc., that take place within the overlapping area of coverage. Thus, when detecting a condition, event, object, threat, etc., pertaining to the overlapping area of coverage, the cameras 720-1 and 720-2 can communicate with each other to verify, enhance, or compare detection results. The different angles and/or perspectives provided by the cameras 720-1 and 720-2 can help when performing a detection operation pertaining to the overlapping area of coverage (e.g., whether a target is approaching the building or simply passing by, for example).

Camera 720-3 can furthermore communicate to cameras 720-1 and 720-2 that a target is approaching a building. Thus, the system can predict a target trajectory and optimize illumination before the target is even captured by cameras 720-1 and 720-2.

As illustrated in this example, multiple camera systems can be configured to overlap coverage in certain areas, such as high incident or value areas, and/or maximize the overall coverage at the site. Overlapping coverage can be used to obtain cross-checking and verification of capture and detection results. Data captured for non-overlapping areas can also be combined to provide a greater overall view or depiction of a site and/or detection results for one or more areas in the site. For example, one camera may capture a criminal event from a human, while another camera may capture the event(s) leading up to the criminal event. To illustrate, one camera system may capture the crime and another camera system may capture a fleeing direction of the criminal. The data captured, and intelligence ascertained, from the non-overlapping areas of coverage of the two camera systems can be combined to enhance the overall understanding of the event and/or detection operations associated with the event.

Applying the techniques of intelligent lighting activation provides a number of benefits. Analytics based lighting provides improved low-light condition footage for video surveillance systems. Video footage can also improve by utilizing modern video analytic algorithms, eliminating frames with saturated IR, improving lighting quality of objects in the background while maintaining quality of objects in the foreground, and directing lights to critical persons or objects of interest for a higher level of security Thus, in the embodiments disclosed, lighting is enhanced by using video analytics algorithms to determine the optimal lighting conditions in a scene. The system uses this information to intelligently activate a light device within a matrix or array of fixed light devices in communication with a camera. For example, when a target is detected within the camera's field of view (FOV), an optimized illumination of the target is determined according to one or more video analytics models. A subset of light devices then receives a request from the camera or a remote server to adjust lighting in accordance with the determined optimized illumination, thereby allowing the subset within the array of light devices to focus on and illuminate targets of interest within the camera's FOV. The camera system can also track and anticipate where the target will be, so that lighting can be appropriately adjusted before over or under saturation occurs, resulting in a more evenly distributed dynamic range of optimized illumination as the target moves throughout the scene.

Figure 8:
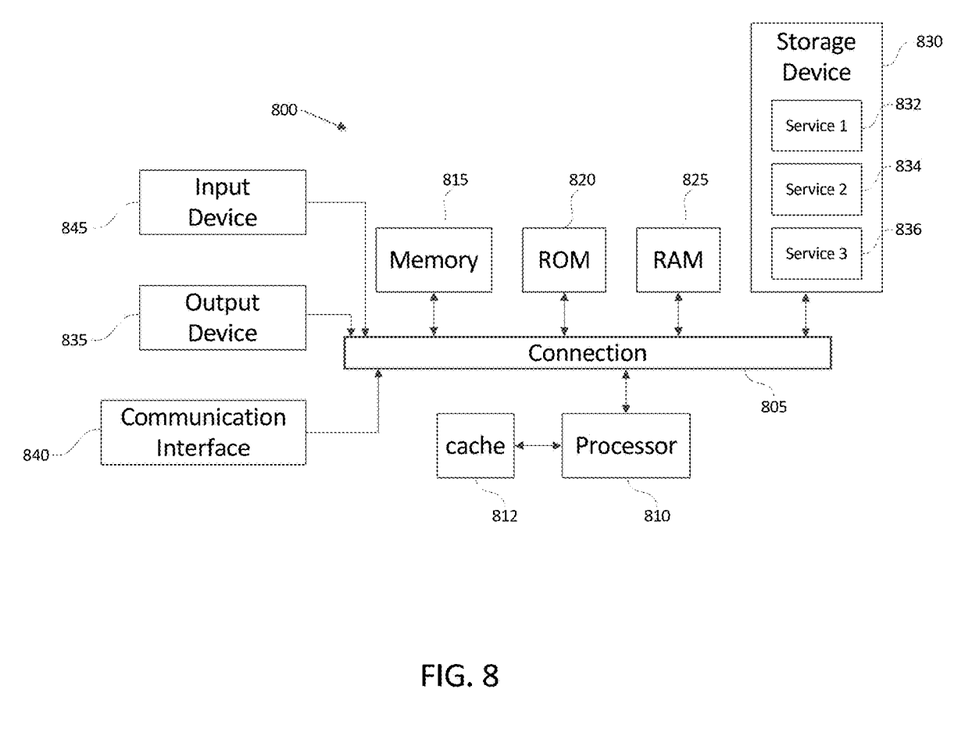
FIG. 8 illustrates an example network device.

FIG. 8 shows an example of computing system 800 in which the components of the system are in communication with each other using connection 805. Computing system 800 can be included within any of camera devices 120 or nodes 118 as described herein. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    detecting a plurality of targets within a field of view of a camera;
    determining a plurality of factors to yield an optimized illumination of the plurality of targets, the plurality of factors including power resources of the camera and at least one of movement within the field of view of the camera or a number of objects within the field of view of the camera, the power resources of the camera including an amount of power needed to turn on a light device at a particular intensity, the light device being within an array of light devices communicatively coupled to the camera, the particular intensity based on a highest priority of one of the plurality of targets and a lowest priority of another one of the plurality of targets; and
    adjusting lighting in accordance with the optimized illumination of the plurality of targets by sending a request to the array of light devices so a first subset of light devices within the array of light devices corresponding to the one of the plurality of targets is optimized to a first intensity and a second subset of light devices within the array of light devices corresponding to another one of the plurality of targets is optimized to a second intensity.

2. The method of claim 1,
    wherein,
    the plurality of factors includes the movement within the field of view,
    the method includes tracking positions of the plurality of targets within the field of view over a time period and predicting at least one of a trajectory or a position of the one of the plurality of targets at a time subsequent to the time period, and
    the sending of the request at the time subsequent to the time period.

3. The method of claim 1, further comprising:
    determining the amount of power needed to turn on the light device within the array of light devices at the particular intensity; and
    based on the amount of power needed for the light device, determining whether to turn on the light device based on one or more contextual rules, the one or more contextual rules based on a context of a scene within the field of view and an energy budget for the camera.

4. The method of claim 3, further comprising:
    determining that the first subset of light devices within the array of light devices are able to focus on the one of the plurality of targets, and the second subset of light devices are unable to focus on the one of the plurality of targets; and based on the energy budget, de-optimizing the second subset of light devices and redirecting power from the second subset of light devices to the first subset of light devices.

5. The method of claim 1, further comprising:
informing a second camera to adjust lighting in accordance with the optimized illumination based on a trajectory of the one of the plurality of targets.

6. The method of claim 1, further comprising:
capturing an audio source outside the field of view of the camera, the optimized illumination determined based on a location of the one of the plurality of targets inferred from the audio source.

7. The method of claim 1, further comprising:
determining the one of the plurality of targets is of the highest priority based on a determination the one of the plurality of targets is a threat.

8. The method of claim 1, further comprising:
determining the one of the plurality of targets is of the highest priority when the one of the plurality of targets is classified as human; and
determining the one of the plurality of targets is of the lowest priority when the another one of the plurality of targets is classified other than human.

9. A camera comprising:
at least one sensor for capturing data; and
at least one processor and at least one memory containing instructions that, when executed, cause the at least one processor to perform operations including:
detecting a plurality of targets within a field of view of the camera;
determining a plurality of factors to yield an optimized illumination of the plurality of targets, the plurality of factors including power resources of the camera and at least one of movement within the field of view of the camera or a number of objects within the field of view of the camera, the power resources of the camera including an amount of power needed to turn on a light device at a particular intensity, the light device being within an array of light devices communicatively coupled to the camera, the particular intensity based on a highest priority of one of the plurality of targets and a lowest priority of another one of the plurality of targets; and
adjusting lighting in accordance with the optimized illumination by sending a request to a subset of light devices within the array of light devices communicatively coupled to the camera so a first subset of light devices within the array of light devices corresponding to the one of the plurality of targets is optimized to a first intensity and a second subset of light devices within the array of light devices corresponding to another one of the plurality of targets is optimized to a second intensity.

10. The camera of claim 9,
wherein,
the plurality of factors includes the movement within the field of view,
the operations include tracking positions of the plurality of targets within the field of view over a time period and predicting at least one of a trajectory or a position of the one of the plurality of targets at a time subsequent to the time period, and
the sending of the request at the time subsequent to the time period.

11. The camera of claim 9, wherein the operations include informing a second camera to adjust lighting in accordance with the optimized illumination based on a trajectory of the one of the plurality of targets.

12. The camera of claim 9, wherein the operations include determining the one of the plurality of targets is of the highest priority based on a determination the one of the plurality of targets is a threat.

13. The camera of claim 9,
wherein the operations include:
determining the one of the plurality of targets is of the highest priority when the one of the plurality of targets is classified as a person, and
determining the one of the plurality of targets is of the lowest priority when the another one of the plurality of targets is classified other than human.

14. A system comprising:
a light device; and
a camera in communication with the light device, the camera including computer readable instructions stored thereon that, when executed, are effective to cause the camera to perform operations including:
detecting a plurality of targets within a field of view of the camera;
determining a plurality of factors to yield an optimized illumination of the plurality of targets, the plurality of factors including power resources of the camera and one or more of movement within the field of view of the camera or a number of objects within the field of view of the camera, the power resources of the camera including an amount of power needed to turn on the light device at a particular intensity, the light device being within an array of light devices communicatively coupled to the camera, the particular intensity based on a highest priority of one of the plurality of targets and a lowest priority of another one of the plurality of targets; and
adjusting lighting in accordance with the optimized illumination by sending a request to a subset of light devices within the array of light devices communicatively coupled to the camera so a first subset of light devices within the array of light devices corresponding to the one of the plurality of targets is optimized to a first intensity and a second subset of light devices within the array of light devices corresponding to another one of the plurality of targets is optimized to a second intensity.

15. The system of claim 14, wherein the array of light devices is external to the camera, each light device within the array of light devices being located at a fixed position.

16. The system of claim 14, wherein the array of light devices is built into the camera, each light device within the array of light devices having a different illumination area.

17. The system of claim 14,
wherein,
the plurality of factors includes the movement within the field of view,
the operations include tracking positions of the plurality of targets within the field of view over a time period and predicting at least one of a trajectory or a position of the one of the plurality of targets at a time subsequent to the time period, and
the sending of the request occurs at the time subsequent to the time period.

18. The system of claim 14, wherein the operations include informing a second camera to adjust lighting in accordance with the optimized illumination based on a trajectory of the one of the plurality of targets.

19. The system of claim 14,
wherein the operations include:
- determining the amount of power needed to turn on the light device within the array of light devices at the particular intensity; and
- based on the amount of power needed for the light device, determining whether to turn on the light device based on one or more contextual rules, the one or more contextual rules based on a context of a scene within the field of view and an energy budget for the camera.

20. The system of claim 14,
wherein the operations include:
- determining the one of the plurality of targets is of the highest priority when the one of the plurality of targets is classified as a person, and
- determining the one of the plurality of targets is of the lowest priority when the another one of the plurality of targets is classified other than human.

\* \* \* \* \*